Patented Apr. 3, 1934

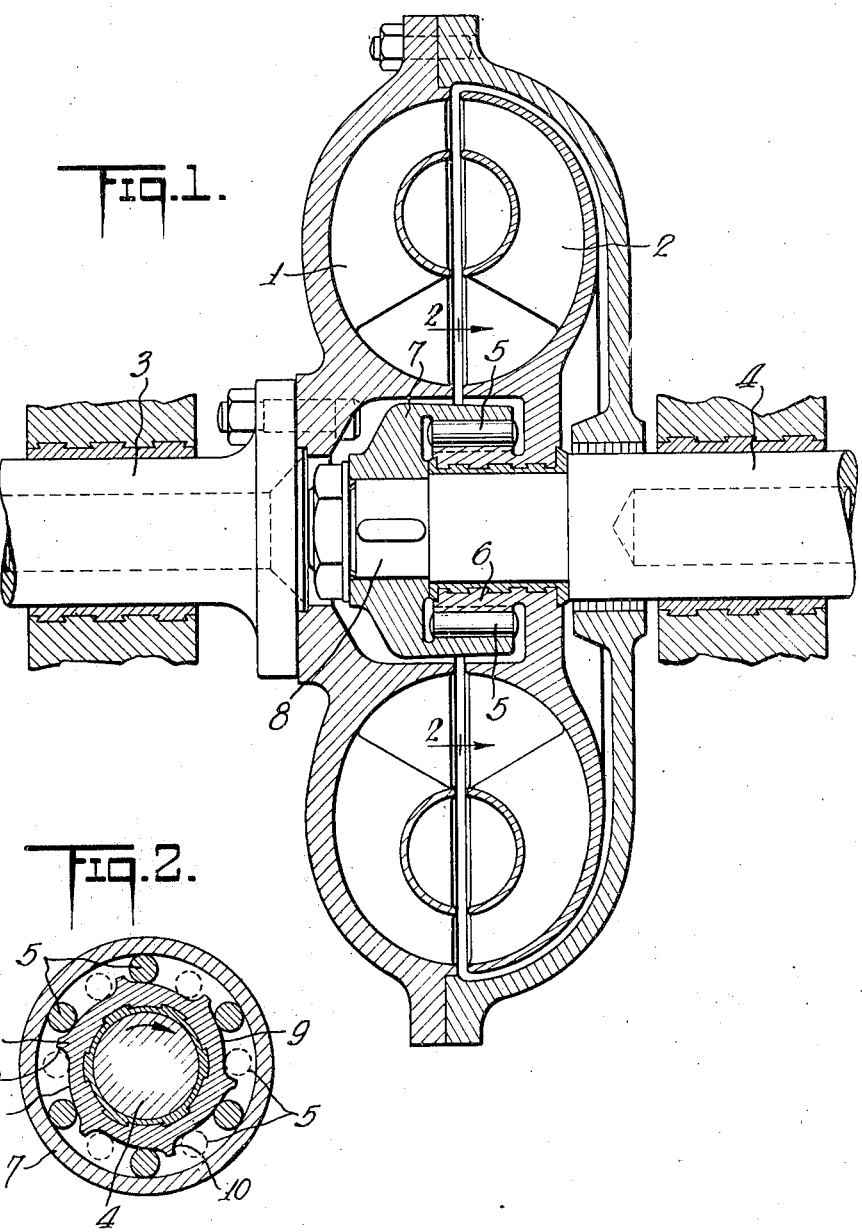

1,953,458

UNITED STATES PATENT OFFICE 1,953,458

HYDRAULIC COUPLING

Gustav Bauer, Hamburg, and Carl Schmieske, Bremen, Germany

Application April 14, 1933, Serial No. 666,074
In Germany June 6, 1931

2 Claims. (Cl. 192—48)

It is known that when hydraulic couplings of the Föttinger or Vulcan type disclosed and claimed in the Föttinger Patent 1,199,359, issued Sept. 26, 1916 and comprising a pair of vaned runners are emptied of liquid, considerable consumption of energy is involved by the windage of the freely rotating runner. This disadvantage is particularly noticeable in engine plants in which engines coupled by hydraulic couplings are used for transmitting different powers and correspondingly different speeds to the driven shaft, for example in marine engine plants with full speed and cruising engines.

This disadvantage is overcome by the invention, one of the vaned runners being connected to its shaft by a free wheel coupling by which the connection between the two shafts is broken without emptying the coupling upon reversal of rotation or at a difference of speed between the two shafts. This makes it possible for the coupling connecting the two engines of different power to disconnect itself automatically from the engine of lower power when a change is made to higher power and speed, so that all losses in the coupling are avoided. Further the usual filling and emptying devices for the coupling (pumps, levers and the like) can be wholly or to the greater part omitted. The coupling is filled once and for all and then requires no further service as regards filling and emptying during its whole operating time.

In the accompanying drawing, Figure 1 shows an example embodying the invention in section. Figure 2 is a cross section on the line 2—2 of Figure 1.

A coupling with the runners 1 and 2 has been chosen as an example. One runner, for example 1, is as usual fast to its shaft 3. The other runner 2 is loose upon its shaft 4 and is coupled thereto in its direction of rotation by a free wheel, but is uncoupled therefrom when the direction of rotation is reversed or when the speed of the shaft 4 rises above that of the runner. Any suitable known form of free wheel can be used. The example shows the use of rollers 5 between the hub 6 of the runner 2 and a sleeve 7 keyed on the end of shaft 4. One of the free wheel parts, in the illustrated example the hub 6, is provided for instance with eccentric or wedge surfaces 9 and stops or abutments 10 for the rollers 5, which surfaces in one direction of rotation of shaft 4 (see the arrow in Figure 2) cause jambing of the rollers 5 and thereby coupling of the runner 2 with the sleeve 7, while in the other direction of rotation or upon the speed of shaft 4 rising above that of the runner 2 the connection is broken.

If for example the shaft 4 transmits the higher power and speed and the shaft 3 the lower power and speed, when the shaft 4 is working owing to the rotation of the sleeve 7 with the shaft 4, the rollers 5 will ride along the surfaces 9 of the stationary or slowly rotating runner 2 so that the connection with the shaft 4 is broken. The runner 2 is therefore no longer entrained by the shaft 4. The coupling between the shafts 3 and 4 is thereby interrupted and no power is transmitted to the shaft 3. If in this case the shaft 3 continues to rotate at its own, lower speed the runner 2 will take up the speed of the runner 1 owing to the circulation of liquid between the runners, the coupling then simply acting as a unitary rotating body rotating at the speed of the shaft 3 without transmitting power either way.

If the shaft 3 alone rotates and is to transmit its power to shaft 4, the runner 1 fast to the shaft 3 transmits its rotation to the runner 2 by the circulation of the liquid, the rollers 5 again becoming jambed between the hub 6 and sleeve 7 so that the shaft 4 is driven and rotates at almost the same speed as the shaft 3.

A main use of the invention is in marine engine plants with high speed and cruising engines. The free wheel coupling then acts so that when the cruising engine is in operation its shaft is coupled to the shaft of the high speed engine which is not in operation and thus transmits its power to the screw shaft. The high speed engine than either runs light or is completely disconnected for example by uncouplable intermediate gearing. When the high speed engine is set in action, the runner of the hydraulic coupling is automatically uncoupled as above described so that the coupling transmits no power back to the cruising engine.

A further use is for plants in which two engines in parallel drive a single shaft through hydraulic couplings and toothed wheel gearing. When both engines are in operation the engine and gear shafts are coupled through the free wheels. If only one engine is in operation the other engine shaft is uncoupled from the gear shaft by the uncoupling of the runner on the gear side from the gear shaft which alone continues to rotate.

The combination of the hydraulic coupling with a free wheel enables considerable slipping to take place during starting without harmful stressing of the coupling. The device can therefore be used with advantage for starting up heavy machines.

What we claim is:—

1. In combination a pair of shafts in axial alignment, a hydraulic coupling of the Föttinger type having a pair of independent juxtaposed members conjointly defining a liquid circulating circuit, one of said members being secured to one of said shafts and the other of said members having a hub mounted on and rotatable in respect to the other shaft, a sleeve secured to said last mentioned shaft and encircling and radially spaced from said hub, and a roller between said sleeve and said hub, one of the opposed surfaces of said hub and sleeve having an eccentric portion and a stop to effect gripping or releasing of said roller in respect to the other surface.

2. In combination a pair of shafts in axial alignment, a hydraulic coupling of the Föttinger type having a pair of independent juxtaposed members conjointly defining a liquid circulating circuit, one of said members being secured to one of said shafts and the other of said members having a hub mounted on and rotatable in respect to the other shaft, and projecting toward the first mentioned shaft, a sleeve secured to the end portion of said last mentioned shaft, extending away from said first mentioned shaft, and encircling and radially spaced from said hub, and a roller between said sleeve and said hub, one of the opposed surfaces of said hub and sleeve having an eccentric portion and a stop to effect gripping or releasing of said roller in respect to the other surface.

GUSTAV BAUER.
CARL SCHMIESKE.